US012804245B2

(12) United States Patent
Yu et al.

(10) Patent No.: US 12,804,245 B2
(45) Date of Patent: Nov. 17, 2026

(54) ELECTRONIC DEVICE COMPRISING CAMERA

(71) Applicant: Samsung Electronics Co., Ltd., Suwon-si (KR)

(72) Inventors: Changrim Yu, Suwon-si (KR); Sungchul Park, Suwon-si (KR); Junghoon Seo, Suwon-si (KR); Wanju Byun, Suwon-si (KR); Sengtai Lee, Suwon-si (KR); Chungik Lee, Suwon-si (KR); Heetak Lee, Suwon-si (KR); Seokmin Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 19/092,619

(22) Filed: Mar. 27, 2025

(65) Prior Publication Data

US 2025/0227353 A1 Jul. 10, 2025

Related U.S. Application Data

(63) Continuation of application No. PCT/KR2023/015241, filed on Oct. 4, 2023.

(30) Foreign Application Priority Data

Oct. 4, 2022 (KR) ........................ 10-2022-0126258
Nov. 25, 2022 (KR) ........................ 10-2022-0160473

(51) Int. Cl.
*H04N 23/55* (2023.01)
*H04M 1/02* (2006.01)
*H04N 23/57* (2023.01)

(52) U.S. Cl.
CPC ............. *H04N 23/55* (2023.01); *H04N 23/57* (2023.01); *H04M 1/0264* (2013.01)

(58) Field of Classification Search
CPC ........ H04N 23/55; H04N 23/57; H04N 23/51; H04M 1/0264
See application file for complete search history.

(56) References Cited

U.S. PATENT DOCUMENTS 10,962,733 B2 * 3/2021 Kim ....................... G02B 7/021
11,233,925 B2 * 1/2022 Moon .................... H04N 23/57
(Continued)

FOREIGN PATENT DOCUMENTS

JP 2001-272565 A 10/2001
JP 2012-227436 A 11/2012
(Continued)

OTHER PUBLICATIONS

International Search Report dated Jan. 8, 2024, issued in International Application No. PCT/KR2023/015241.

*Primary Examiner* — Ahmed A Berhan
(74) *Attorney, Agent, or Firm* — Jefferson IP Law, LLP

(57) ABSTRACT

According to an embodiment of the disclosure, an electronic device includes a camera module having an angle of view formed in a first direction, and a recess configured to accommodate the camera module, wherein the camera module may include at least one lens, and a lens barrel that encloses the at least one lens and includes at least one portion having an outer diameter that decreases in the first direction, and the recess may include an inclined surface inclined toward the lens barrel. Electronic devices as described above may vary according to embodiments.

15 Claims, 11 Drawing Sheets

(56) References Cited

U.S. PATENT DOCUMENTS

| | | | | |
|---|---|---|---|---|
| 11,647,265 | B2 * | 5/2023 | Abe ........................ | B60R 11/04<br>348/373 |
| 2009/0057732 | A1 | 3/2009 | Park | |
| 2021/0120150 | A1 | 4/2021 | Moon | |
| 2022/0197114 | A1 | 6/2022 | Han et al. | |

FOREIGN PATENT DOCUMENTS

| | | | |
|---|---|---|---|
| JP | 2015-206832 | A | 11/2015 |
| JP | 2021-185398 | A | 12/2021 |
| KR | 10-0875172 | B1 | 12/2008 |
| KR | 10-2009-0110978 | A | 10/2009 |
| KR | 10-2010-0009339 | A | 1/2010 |
| KR | 10-2010-0111954 | A | 10/2010 |
| KR | 10-2014-0105149 | A | 9/2014 |
| KR | 10-2015-0014102 | A | 2/2015 |
| KR | 10-2015-0115504 | A | 10/2015 |
| KR | 10-2020-0110983 | A | 9/2020 |
| KR | 10-2021-0046256 | A | 4/2021 |
| KR | 10-2022-0050542 | A | 4/2022 |

* cited by examiner

ELECTRONIC DEVICE COMPRISING CAMERA

CROSS-REFERENCE TO RELATED APPLICATIONS

This application is a continuation application, claiming priority under 35 U.S.C. § 365(c), of an International application No. PCT/KR2023/015241, filed on Oct. 4, 2023, which is based on and claims the benefit of a Korean patent application number 10-2022-0126258, filed on Oct. 4, 2022, in the Korean Intellectual Property Office, and of a Korean patent application number 10-2022-0160473, filed on Nov. 25, 2022, in the Korean Intellectual Property Office, the disclosure of each of which is incorporated by reference herein in its entirety.

BACKGROUND

1. Field

An embodiment of the disclosure relates to an electronic device including a camera.

2. Description of Related Art

Recently, an electronic device (e.g., a smartphone) to which a so-called full display structure in which a bezel is minimized and an active area is expanded is applied has been disclosed. An electronic device may include a front camera. In this case, in the electronic device to which the full display structure is applied, vision alignment may be performed in order to reduce the size of a camera hole for the front camera and to make the electronic device thinner.

The camera may include at least one lens, a lens barrel including the at least one lens, and an image sensor. According to an embodiment, the camera may be implemented as a camera module including a housing that encloses the lens barrel and the image sensor. At least one camera module may be mounted in the electronic device. When designing an electronic device, a printing error of a display, an angle of view error of the camera module, an assembly error of the display, the camera module, and other components are considered. By performing vision alignment, when the camera module is focused and is fixed by an adhesive (e.g., by bonding), it is not necessary to consider the assembly error and the like, which makes it possible to fabricate the electronic device thinly.

An electronic device may be designed by coupling components in a state in which a camera module is disposed inside the housing. In this process, the camera module may be bonded to the housing. A method of bonding the camera module to the housing may be implemented, for example, by injecting an ultra-violet (UV)-curable resin (e.g., bond) into a space between the housing and a support structure in a state in which the camera module is seated on the support structure (e.g., front plate) inside the housing and curing the UV-curable resin with UV rays. However, due to the generally convex shape of the camera module, the curing depth of the UV-curable resin injected into the space between the camera module and the support structure (e.g., front plate) inside the housing may be shallow, or the bonding strength obtained due to curing may be weakened. When the curing depth of the UV-curable resin is shallow or the bonding strength obtained due to curing is weakened, the camera module may be displaced from a preset fixed position, or the vision alignment may be distorted due to poor bonding between the camera module and the housing.

The above-described information may be provided as background for the purpose of helping understanding of the disclosure. No claim or determination is made as to whether any of the foregoing may be applied as a prior art in connection with the disclosure.

SUMMARY

According to an embodiment, the disclosure provides an electronic device including a camera module having an angle of view toward a first direction, a recess configured to accommodate the camera module, and an UV-curable resin disposed in a gap between the camera module and the recess. The camera module includes a lens barrel that encloses at least one lens and includes a protrusion that has a convex shape toward the first direction, when the camera module is viewed in the first direction in a state in which the camera module is accommodated in the recess, the UV-curable resin comprises a first resin portion which does not overlap with the camera module and a second resin portion which overlaps with the camera module, and the recess includes a first surface and a second surface, which are in contact with the first resin portion, and an inclined surface between the first surface and the second surface.

BRIEF DESCRIPTION OF THE DRAWINGS

The above-described aspects or other aspects, configurations, and/or advantages regarding an embodiment of the disclosure may become more apparent through the following detailed description made with reference to the accompanying drawings.

DETAILED DESCRIPTION

Figure 1:
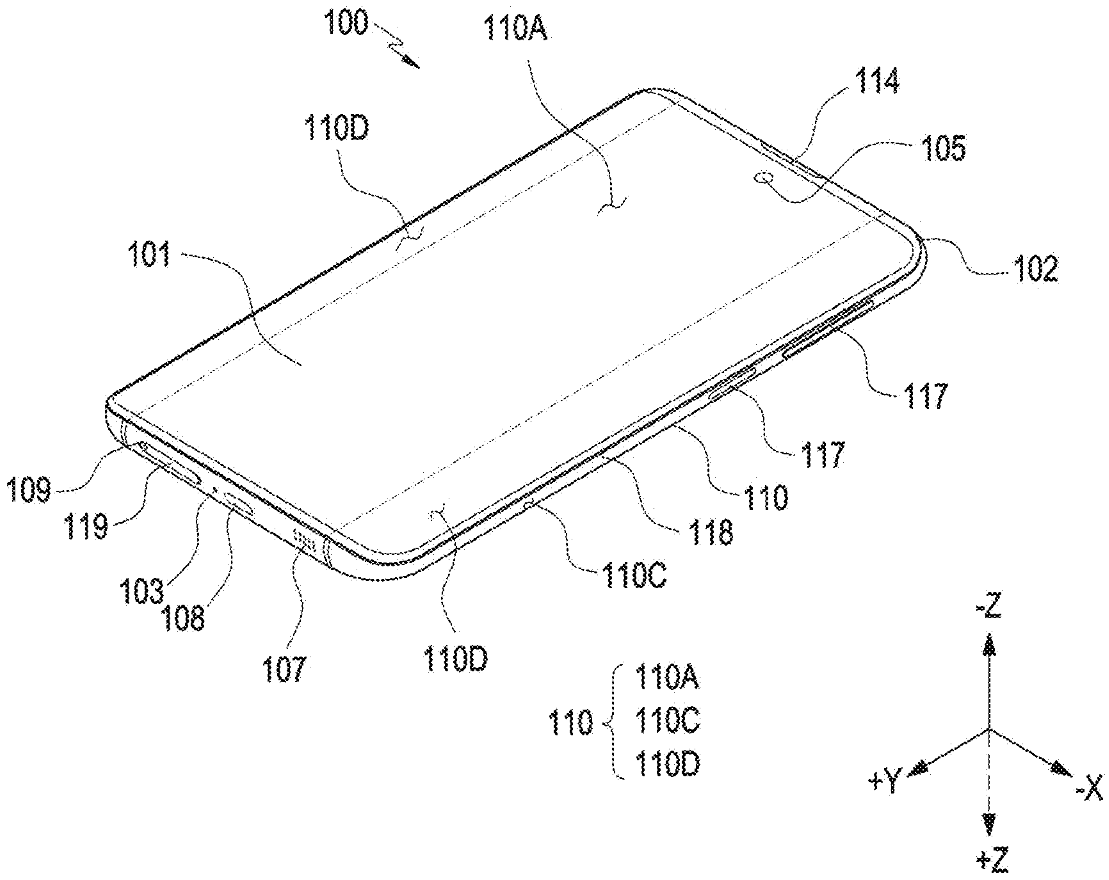
FIG. 1 is a front perspective view of an electronic device according to an embodiment of the disclosure.

The embodiments described below are provided so that a person ordinarily skilled in the art can easily understand the technical spirit of the disclosure, and the disclosure is not limited thereto. In addition, items represented in the accompanying drawings, which are schematically illustrated to easily describe the embodiments of the disclosure, may be different from those actually implemented in shapes.

Before describing various embodiments of the disclosure in detail, it is to be understood that the application of the embodiments is not limited to the details of the constructions and arrangements of components described in the following detailed description or illustrated in the drawings. When a component is referred to as being "connected" or "joined" to another component, it is to be understood that the component may be directly connected or joined to the other element, but a still another component may be present therebetween. In addition, "connection" herein includes a direct connection and an indirect connection between one member and another member, and may refer to all physical connections, such as adhesion, attachment, fastening, bonding, and coupling, and electrical connections.

Terms used herein are merely used for the purpose of describing specific embodiments and are not intended to limit the disclosure. Singular expressions include plural expressions unless the context clearly dictates otherwise. In the disclosure, it is to be understood that the terms such as "include" and "have" are intended to indicate the presence of features, numbers, steps, operations, components described in the specification, or combinations thereof, but are not intended to preclude the possibility of presence or addition of one or more other features, numbers, steps, operations, components, parts, or combinations thereof.

In the following detailed description, a length direction, a width direction, and/or a height direction (thickness direction) of an electronic device may be referred to, wherein the length direction may be defined as the "Y-axis direction", the width direction may be defined as the "X-axis direction", and/or the height direction (or thickness direction) may be defined as the "Z-axis direction". In some embodiments, "negative/positive (−/+)" may be referred to together with the Cartesian coordinate system illustrated in the drawings regarding the directions in which components are oriented. For example, the front surface of an electronic device or a housing may be defined as a "surface oriented in the +Z direction", and the rear surface may be defined as a "surface oriented in the −Z direction". In some embodiments, the side surface of the electronic device or the housing may include a surface oriented in the +X direction, a surface oriented in the +Y direction, a surface oriented in the −X direction, and/or a surface oriented in the −Y direction. In another embodiment, the "X-axis direction", the "Y-axis direction", and/or the "Z-axis direction" may include "both the −X direction and the +X direction", "both the −Y direction and +Y direction", and/or "both the −Z-axis direction and the +Z-axis direction", respectively. In addition, in the following description, a "first direction" may be a direction in which the center of the angle of view of a camera module is oriented, and may mean the "+Z-axis direction". In the following description, the first direction may be referred to as the "direction of gravity" for better understanding. It is noted that these are based on the Cartesian coordinate system described in the drawings for the sake of brevity of description, and the description of these directions or components does not limit the various embodiments disclosed herein.

Figure 2:
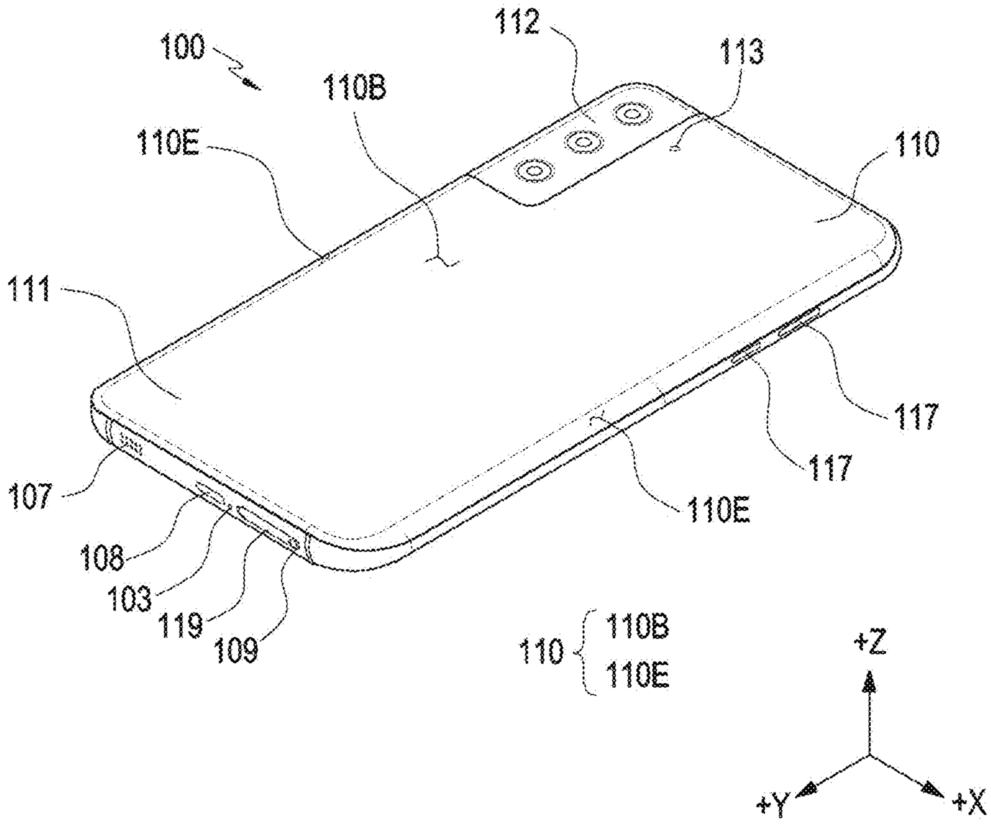
FIG. 2 is a rear perspective view of the electronic device according to an embodiment.

FIG. 1 is a front perspective view of an electronic device 100 according to an embodiment of the disclosure. FIG. 2 is a rear perspective view of the electronic device 100 according to an embodiment of the disclosure.

Referring to FIGS. 1 and 2, the electronic device 100 according to an embodiment may include a housing 110 including a front surface 110A, a rear surface 110B, and a side surface 110C surrounding the space between the front surface 110A and the rear surface 110B. In another embodiment (not illustrated), the term "housing 110" may refer to a structure defining some of the front surface 110A, the rear surface 110B, and the side surface 110C of FIG. 1. According to an embodiment, at least a portion of the front surface 110A may be defined by a substantially transparent front surface plate 102 (e.g., a glass plate or a polymer plate including various coating layers). The rear surface 110B may be defined by the rear surface plate 111. The rear surface plate 111 may be formed of, for example, glass, ceramic, polymer, metal (e.g., aluminum, stainless steel (STS), or magnesium), or a combination of two or more of these materials. The side surface 110C may be defined by a side surface bezel structure (or a "side surface member") 118 coupled to the front surface plate 102 and the rear surface plate 111 and including metal and/or polymer. In some embodiments, the rear surface plate 111 and the side surface bezel structure 118 may be configured integrally with each other and may include the same material (e.g., glass, a metal material such as aluminum, or ceramic).

In the illustrated embodiment, the front surface plate 102 may include, at the long opposite side edges thereof, two first edge areas 110D, which are bent from the front surface 110A toward the rear surface plate 111 and extend seamlessly. In the illustrated embodiment (see FIG. 2), the rear surface plate 111 may include, at the long opposite side edges thereof, two second edge areas 110E, which are bent from the rear surface 110B toward the front surface plate 102 and extend seamlessly. In some embodiments, the front surface plate 102 (or the rear surface plate 111) may include only one of the first edge areas 110D (or the second edge areas 110E). In another embodiment, some of the first edge areas 110D or the second edge areas 110E may not be included. In the above-described embodiments, when viewed from a side of the electronic device 100, the side surface bezel structure 118 may have a first thickness (or width) on the side where the first edge areas 110D or the second edge areas 110E are not included, and may have a second thickness, which is smaller than the first thickness, on the side where the first edge areas 110D or the second edge areas 110E are included.

According to an embodiment, the electronic device 100 may include at least one of a display 101, audio modules 103, 107, and 114, a sensor module, camera modules 105, 112, and 113, key input devices 117, a connector hole 108, and a tray hole 109. In some embodiments, in the electronic device 100, at least one of the above-mentioned components may be omitted or other components may be additionally included.

According to an embodiment, the display 101 may be visually exposed, for example, through a substantial portion of the front surface plate 102. In some embodiments, at least a portion of the display 101 may be exposed through the front surface plate 102 defining the front surface 110A and the first edge areas 110D. In some embodiments, the edges of the display 101 may be configured to be substantially the same as the shape of the periphery of the front surface plate 102 adjacent thereto. In another embodiment (not illustrated), the distance between the periphery of the display 101 and the periphery of the front surface plate 102 may be substantially constant in order to increase the exposed area of the display 101.

According to an embodiment, the surface of the housing 110 (or the front surface plate 102) may include a screen display area provided since the display 101 is visually exposed. For example, the screen display area may include the front surface 110A and the first edge areas 110D.

In another embodiment (not illustrated), the screen display area (e.g., the front surface 110A and the first edge areas 110D) of the display 101 may have a recess or an opening provided in a portion thereof and may include at least one of an audio module 114, a sensor module (not illustrated), a light-emitting element (not illustrated), and a camera module 105, which are aligned with the recess or the opening. In another embodiment (not illustrated), the rear surface of the screen display area of the display 101 may include at least one of an audio module 114, a sensor module (not illustrated), a camera module 105, a fingerprint sensor (not illustrated), and a light-emitting element (not illustrated).

In another embodiment (not illustrated), the display 101 may be coupled to or disposed adjacent to a touch-sensitive circuit, a pressure sensor capable of measuring a touch intensity (pressure), and/or a digitizer configured to detect an electromagnetic field-type stylus pen.

In some embodiments, at least some of the key input devices 117 may be disposed in the first edge areas 110D and/or the second edge areas 110E.

According to an embodiment, the audio modules 103, 107, and 114 may include, for example, a microphone hole 103 and speaker holes 107 and 114. The microphone hole 103 may include a microphone disposed therein to acquire external sound, and in some embodiments, a plurality of microphones may be disposed therein to be able to detect the direction of sound. The speaker holes 107 and 114 may include an external speaker hole 107 and a communication receiver hole 114. In some embodiments, while implementing the speaker holes 107 and 114 and the microphone hole 103 as a single hole, or without the speaker holes 107 and 114, a speaker (e.g., a piezo speaker) may be included. The audio modules 103, 107, and 114 are not limited to the above-described structure, and various design changes may be made, such as mounting only some audio modules or adding a new audio module, depending on the structure of the electronic device 100.

According to an embodiment, sensor modules (not illustrated) may generate an electrical signal or a data value corresponding to, for example, an internal operating state of the electronic device 100 or an external environmental state. The sensor modules (not illustrated) may include, for example, a first sensor module (not illustrated) (e.g., a proximity sensor) and/or a second sensor module (not illustrated) (e.g., a fingerprint sensor) disposed on the front surface 110A of the housing 110, and/or a third sensor module (not illustrated) (e.g., an HRM sensor) and/or a fourth sensor module (not illustrated) (e.g., a fingerprint sensor) disposed on the rear surface 110B of the housing 110. In some embodiments (not illustrated), the fingerprint sensor may be disposed not only on the front surface 110A (e.g., the display 101) of the housing 110, but also on the rear surface 110B. The electronic device 100 may further include at least one of sensor modules (not illustrated in the drawings), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not illustrated). The sensor modules (not illustrated) are not limited to the above-described structure, and various design changes such as mounting only some of the sensor modules and adding new sensor modules may be made depending on the structure of the electronic device 100.

According to an embodiment, the camera modules 105, 112, and 113 may include, for example, a front camera module 105 disposed on the front surface 110A of the electronic device 100, a rear camera module 112 disposed on the rear surface 110B, and/or a flash 113. The camera modules 105 and 112 may include one or more lenses, an image sensor, and/or an image signal processor. The flash 113 may include, for example, a light-emitting diode or a xenon lamp. In some embodiments, two or more lenses (e.g., an infrared camera, a wide-angle lens, and a telephoto lens), and image sensors may be disposed on one surface of the electronic device 100. The camera modules 105, 112, and 113 are not limited to the above-described structure, and various design changes such as mounting only some of the camera modules and adding new camera modules may be made depending on the structure of the electronic device 100.

According to an embodiment, the electronic device 100 may include a plurality of camera modules (e.g., a dual camera or a triple camera) having different properties (e.g., fields of view) or functions, respectively. For example, a plurality of camera modules 105 and 112 including lenses having different fields of view may be configured, and the electronic device 100 may control the change of the fields of view of the camera modules 105 and 112 executed therein based on a user's selection. For example, at least one of the plurality of camera modules 105 and 112 may be a wide-angle camera, and at least one of other camera modules may be a telephoto camera. Similarly, at least one (e.g., 105) of the plurality of camera modules 105 and 112 may be a front camera, and at least one of other cameras (e.g., 112) may be a rear camera. In addition, the plurality of camera modules 105 and 112 may include at least one of a wide-angle camera, an ultra-wide-angle camera, a macro camera, a telephoto camera, or an infrared (IR) camera (e.g., a time-of-flight (TOF) camera, or a structured light camera). According to an embodiment, the IR camera may be operated as at least a part of a sensor module. For example, the TOF camera may be operated as at least a part of a sensor module (not illustrated) for detecting a distance to a subject. According to an embodiment, some of the plurality of camera modules 105 and 112 (e.g., the front camera module 105) may be implemented as an under display camera (UDC).

According to an embodiment, the key input devices 117 may be disposed on the side surface 110C of the housing 110. In another embodiment, the electronic device 100 may not include some or all of the above-mentioned key input devices 117, and the key input devices 117, which are not included in the electronic device 101, may be implemented in another form, such as soft keys, on the display 101. In some embodiments, a key input device may include a sensor module (not illustrated) disposed on the rear surface 110B of the housing 110.

According to an embodiment, the light-emitting element (not illustrated) may be disposed on, for example, the front surface 110A of the housing 110. The light-emitting element (not illustrated) may provide, for example, the state information of the electronic device 100 in an optical form. In another embodiment, the light-emitting element (not illustrated) may provide a light source that is interlocked with, for example, the operation of the front camera module 105.

The light-emitting element (not illustrated) may include, for example, an LED, an IR LED, and/or a xenon lamp.

According to an embodiment, the connector hole 108 may include, for example, a first connector hole 108 capable of accommodating a connector (e.g., a USB connector) for transmitting/receiving power and/or data to and from an external electronic device, and may further include a second connector hole (e.g., an earphone jack) (not illustrated) capable of accommodating a connector for transmitting/receiving an audio signal to/from an external electronic device. The connector hole 108 is not limited to the above-described structure, and various design changes such as providing only some of the connector holes and adding new connector holes may be made depending on the structure of the electronic device 100.

According to an embodiment, the tray hole 109 may be, for example, a configuration for accommodating a storage medium mounting tray 119. Here, the storage medium mountable in the tray hole 109 may include at least one of a subscriber identification module (SIM) card and a secure digital (SD) card. The tray hole 109 is illustrated as being provided on the lower end surface of the housing 110 in FIGS. 1 and 2, but may be provided on the side surface or the upper end surface of the housing 110, and this arrangement may vary depending on the use, function and various designs of the electronic device 100.

According to an embodiment, a camera module 105 and/or a sensor module (not illustrated) may be disposed in the inner space of the electronic device 100 to come into contact with the external environment through a predetermined area of the display 101 and the front surface plate 102. For example, the predetermined area may be an area in which pixels are not disposed in the display 101. As another example, the predetermined area may be an area in which pixels are disposed in the display 101. When viewed from above the display 101, at least a portion of the predetermined area may overlap the camera module 105 and/or the sensor module. As another embodiment, some sensor modules may be arranged in the inner space of the electronic device to implement the functions thereof without being visually exposed through the front surface plate 102.

Figure 3:
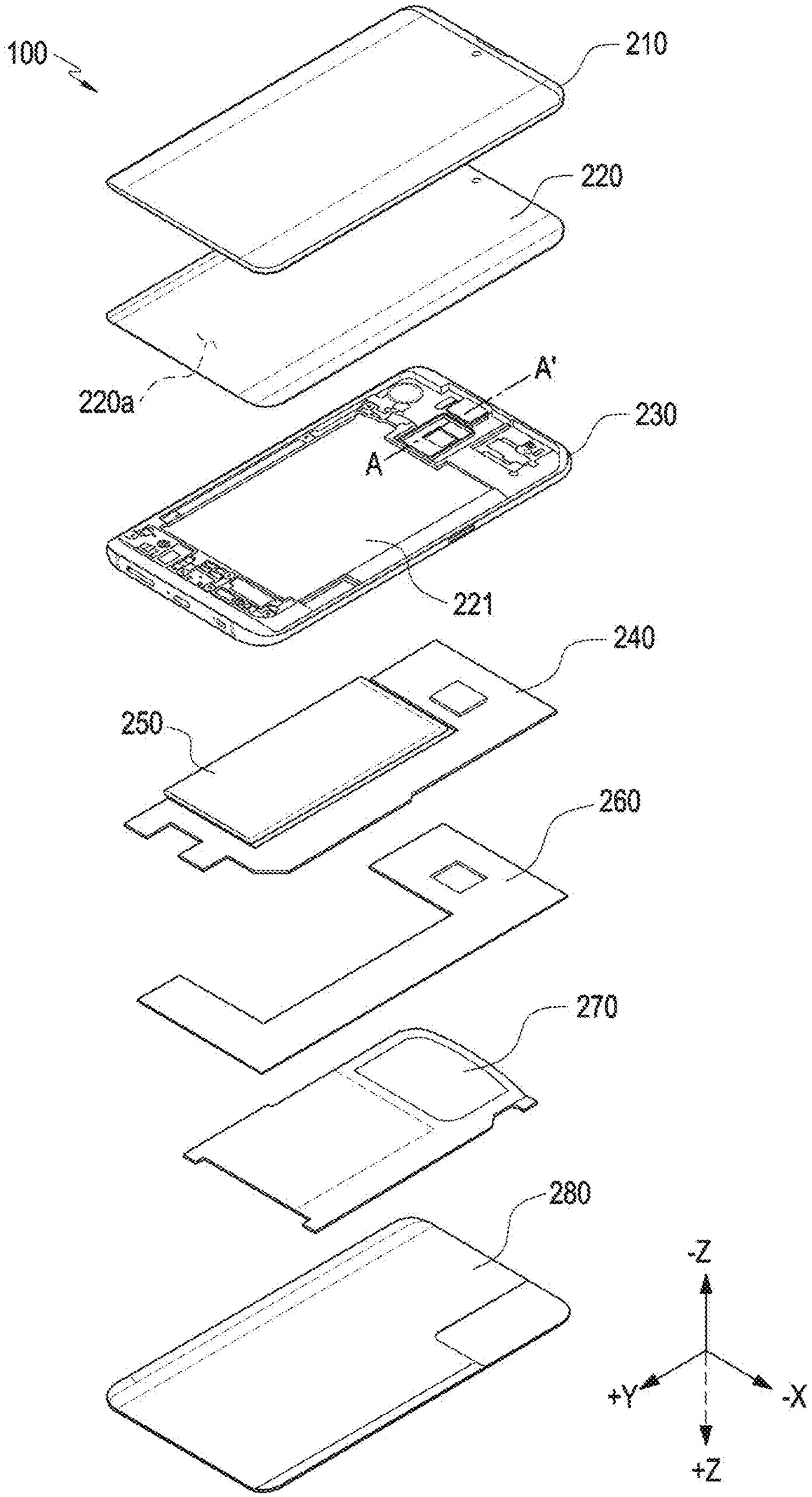
FIG. 3 is an exploded perspective view of an electronic device according to an embodiment.

FIG. 3 is an exploded perspective view illustrating an electronic device according to an embodiment of the disclosure.

Referring to FIG. 3, the electronic device 100 (e.g., the electronic device 100 in FIGS. 1 and 2) may include a front surface plate 210 (e.g., the front surface plate 102 in FIG. 1), a display 220 (e.g., the display 101 in FIG. 1), a support member 221 (e.g., the front case), a printed circuit board 240 (e.g., a PCB, a flexible PCB (FPCB), or a rigid flexible PCB (RFPCB)), a battery 250, a second support member 260 (e.g., the rear case), an antenna 270, and a rear surface plate 280 (e.g., the rear surface plate 111 in FIG. 2). In some embodiments, in the electronic device 100, at least one of the components (e.g., the support member 221 or the second support member 260) may be omitted, or other components may be additionally included. At least one of the components of the electronic device 100 may be the same as or similar to at least one of the components of the electronic device 100 of FIG. 1 or 2, and a redundant description thereof will be omitted below.

According to an embodiment, the support member 221 is a component disposed inside the electronic device 100 to support another component or structure in the electronic device and may be connected to the side surface bezel structure 230 or may be configured integrally with the side surface bezel structure 230. The support member 221 may be made of, for example, a metal material and/or a non-metal (e.g., polymer) material. According to an embodiment, the support member 221 may include one surface to which the display 220 is coupled and the other surface to which the printed circuit board 240 is coupled. However, specific combinations and/or arrangements between components may be variously applied for each embodiment. The support member 221 may include a surface at least partially parallel to the front surface plate 210 and/or the display 220 of the electronic device 100.

A processor, memory, and/or interface may be mounted on the printed circuit board 240. The processor may include one or more of, for example, a central processor, an application processor, a graphics processor, an image signal processor, a sensor hub processor, or a communication processor. According to an embodiment, the printed circuit board 240 may include a flexible printed circuit board-type radio frequency cable (FRC). For example, the printed circuit board 240 may be disposed in at least a portion of the support member 221 and may be electrically connected to an antenna module and a communication module. The support member 221 may also be referred to as a first support member 221 for distinction from a second support member 260 to be described below. According to an embodiment, the memory may include, for example, a volatile memory or a nonvolatile memory. According to an embodiment, the interface may include, for example, a high-definition multimedia interface (HDMI), a universal serial bus (USB) interface, an SD card interface, and/or an audio interface. For example, the interface may electrically or physically connect the electronic device 100 to an external electronic device and may include a USB connector, an SD card/MMC connector, or an audio connector.

According to an embodiment, the battery 250 is a device for supplying power to at least one component of the electronic device 100, and may include, for example, a non-rechargeable primary battery, a rechargeable secondary battery, or a fuel cell. At least a portion of the battery 250 may be disposed on substantially the same plane as, for example, the printed circuit board 240. The battery 250 may be integrally disposed inside the electronic device 100, or may be disposed to be detachable from the electronic device 100.

According to an embodiment, the second support member 260 (e.g., the rear case) may be disposed between the printed circuit board 240 and the antenna 270. For example, the second support member 260 may include one surface to which at least one of the printed circuit board 240 and the battery 250 is coupled, and the other surface to which the antenna 270 is coupled.

According to an embodiment, the antenna 270 may be disposed between the rear surface plate 280 and the display 250. The antenna 270 may include, for example, a near-field communication (NFC) antenna, a wireless charging antenna, and/or a magnetic secure transmission (MST) antenna. For example, the antenna 270 may execute short-range communication with an external electronic device or may transmit/receive power required for charging to/from the external electronic device in a wireless manner. For example, the antenna 270 may include a coil for wireless charging. In another embodiment, an antenna structure may be configured by the side surface bezel structure 230 and/or a portion of the first support member 221, or a combination thereof.

According to an embodiment, the rear surface plate 280 may define at least a portion of the rear surface of the electronic device 100 (e.g., the rear surface 110B in FIG. 2).

Although the electronic device 100 illustrated in FIGS. 1 to 3 has a bar-type or plate-type appearance, the disclosure is not limited thereto. For example, the illustrated electronic device may be a part of a rollable electronic device or a foldable electronic device. The term "rollable electronic device" may refer to an electronic device that has a deformable display so that at least a portion of the display is capable of being wound or rolled or capable of being accommodated into the housing 110. According to a user's need, the rollable electronic device may be used in the state in which the screen display area is expanded by unfolding the display or exposing a larger area of the display to the outside. The term "foldable electronic device" may refer to an electronic device in which two different areas of the display are foldable to face each other or to be oriented in directions opposite to each other. In general, in the foldable electronic device in a carried state, the display is folded in the state in which two different areas face each other or in opposite directions, and in actual use, the user may unfold the display such that the two different areas provide a substantially flat plate shape. In some embodiments, the electronic device 100 according to various embodiments disclosed herein may be interpreted as including not only a portable electronic device such as a smartphone, but also various other electronic devices such as a notebook computer or a home appliance.

Referring back to FIGS. 1 to 3, the electronic device 100 may further include at least one camera module. After the camera module is accommodated in a space provided in the housing 110 (e.g., the support member 221 and/or the side surface bezel structure 230) of the electronic device, vision alignment may be performed during a bonding process with an adhesive as described above in the background section of the disclosure.

Hereinafter, various embodiments for solving the problems that the UV-curable resin is cured at a shallow depth or the bonding strength obtained due to curing is weakened when an adhesive (e.g., a UV-curable resin) is cured by UV during vision alignment will be provided with reference to FIGS. 4 to 11.

Various types of camera modules may be installed in the electronic device 100. As described above with reference to FIG. 1, the camera module mounted in the electronic device 100 may include various cameras such as a wide-angle camera, an ultra-wide-angle camera, a macro camera, a telephoto camera, or an IR (infrared) camera (e.g., a time of flight (TOF) camera, structured light camera). In addition, the camera module mounted in the electronic device 100 may include a front camera and a rear camera depending on the position where the camera module is mounted. It is noted that the following description is based on the front camera for convenience. In addition, the camera module of the disclosure is a camera module that may be mounted in the front surface (e.g., the front surface 110A of FIG. 1) of the electronic device 100, and may be, for example, an under display camera (UDC) disposed in the rear surface of the display 220.

Figure 4:
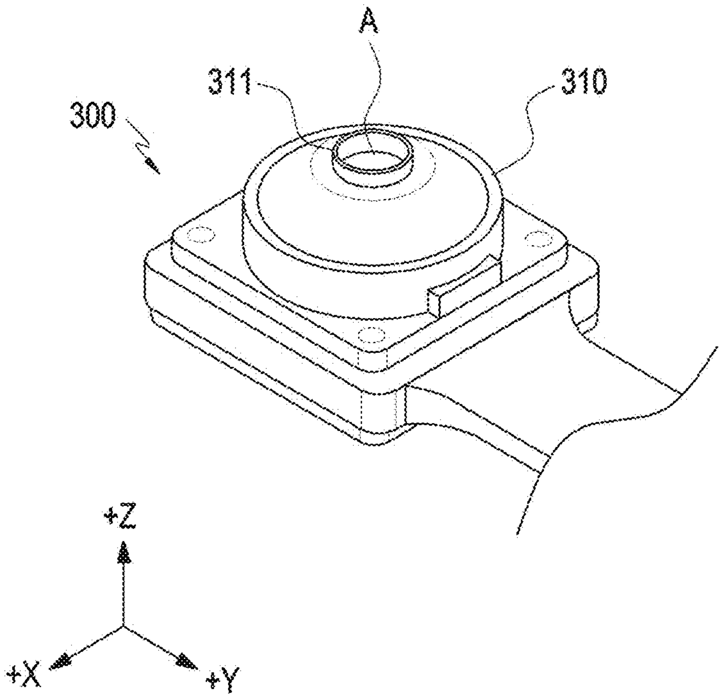
FIG. 4 is a perspective view of a camera module according to an embodiment.
Figure 5:
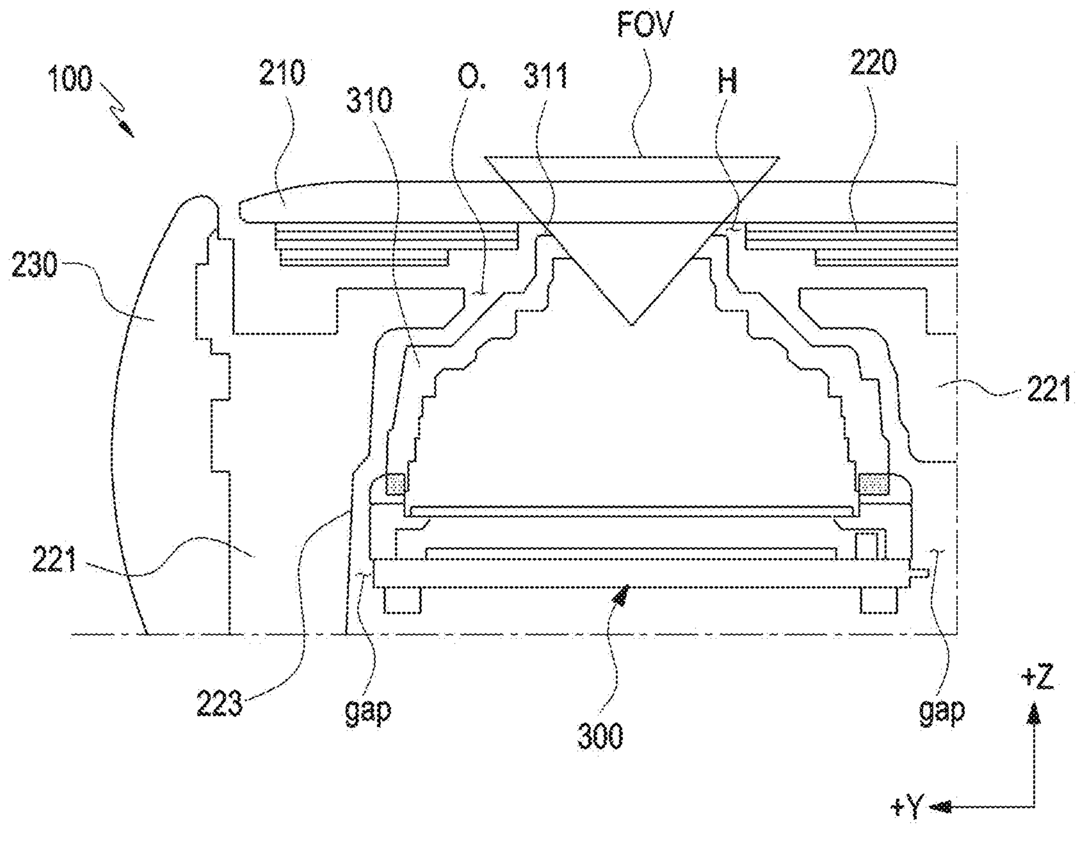
FIG. 5 is a view illustrating a state in which a camera module according to an embodiment is accommodated in a recess.

A camera module according to an embodiment may include a lens assembly, a lens barrel that encloses at least a portion of the lens assembly, and a camera housing that encloses at least a portion of the lens barrel. The electronic device may include a recess that is recessed to accommodate the camera module. In addition, a gap between the camera module and the recess may be filled with a UV-curable resin for fixing the camera module. For example, when the camera module has a rectangular parallelepiped camera housing, the UV-curable resin filled between the camera module and the recess may flow down in the direction of gravity, e.g. in a +Z direction, along the side surface of the camera housing and the recess and may be then cured by UV light emitted by a UV emitting device. When the camera housing has the rectangular parallelepiped shape, since there are no grooves recessed in the thickness direction, other undercut shapes, or the like on the side surface of the housing, the UV light emitted from the UV emitting device may reach approximately the position where the UV-curable resin flows deeply. Accordingly, the UV-curable resin disposed between the camera module and the recess may be sufficiently cured to have high bonding strength based on a large bonding area. However, it may be difficult to apply the camera module including the rectangular parallelepiped camera housing to a thin electronic device. For example, the diameter of the recess is determined depending on the outermost protruding configuration (e.g., the camera housing) included in the camera module. When the diameter of the outermost protruding configuration (e.g., the camera housing) is large, it may be difficult to accommodate the camera module in the camera hole H of the front camera. As a result, the thickness of the electronic device may increase. In addition, since it is difficult to place the camera module adjacent to the camera hole H, it may be difficult to fabricate the camera module to satisfy a designated angle of view. FIG. 4 is a perspective view of a camera module according to an embodiment. FIG. 5 is a view illustrating a state in which a camera module according to an embodiment is accommodated in a recess.

Here, FIG. 5 is a cross-sectional view of the electronic device 100 of FIG. 3 taken along direction A-A' and may illustrate a state in which the camera module 300 is accommodated in the recess 223 of the electronic device. According to an embodiment, the recess 223 may be provided in one surface of the support member 221 disposed inside the electronic device 100. In the case where the support member 221 is integrated with the side surface bezel structure 230, the recess 223 may be expressed as being provided in a housing (e.g., the housing 110 in FIG. 1) of an electronic device.

Referring to FIGS. 4 and 5, the camera module 300 according to an embodiment of the disclosure may include a lens assembly A and a lens barrel 310 that at least partially encloses the lens assembly A. The camera module 300 according to the embodiment illustrated in FIGS. 4 and 5 may have a shape in which the lens barrel 310 directly faces the housing and/or another part of the electronic device without a separate camera housing. In this case, the lens barrel 310 may have a shape that is generally convex toward the front surface plate 210 or the display 220 side. Referring to FIG. 5, the camera module 300 may be disposed in the recess 223. Here, the recess 223 may have a concept including a generally concave groove, a hole, and/or a sink structure. According to an embodiment, an opening (O.) may be provided in the support member 221. The opening (O.) may provide a space for accommodating the camera module 300 together with the recess 223.

According to an embodiment, as illustrated in FIG. 5, the camera module 300 may be accommodated in the space in the state of being aligned to the recess 223 and the opening (O.) of the support member 221 in one direction (e.g., the +Z-axis direction). When the camera module 300 is accommodated in and aligned to the recess 223, a gap may be provided between the camera module 300 and the recess 223 in consideration of tolerances between parts. The position of the camera module 300 may be fixed when a UV-curable resin is filled in the gap and cured. As in the embodiment illustrated in FIG. 5, when the convex-shaped camera module 300 is accommodated in the concave-shaped recess 223, it is possible to dispose the outermost portion (e.g., a first end portion 311 or a head portion) of the lens barrel 310 close to the camera hole H through the opening (O.) in the side surface bezel structure 221. Thus, it may be easy for the camera module to have a pre-configured angle of view (FOV). Compared to the camera module including the above-mentioned rectangular parallelepiped camera housing, the camera module 300 according to the embodiment illustrated in FIGS. 4 and 5 may be advantageous in miniaturizing and/or thinning the electronic device.

In FIGS. 6 to 9 to be described later, various embodiments of the disclosure will be described in detail with reference to an electronic device in which a convex-shaped camera module 300 is accommodated in a concave-shaped recess 223.

Figure 6:
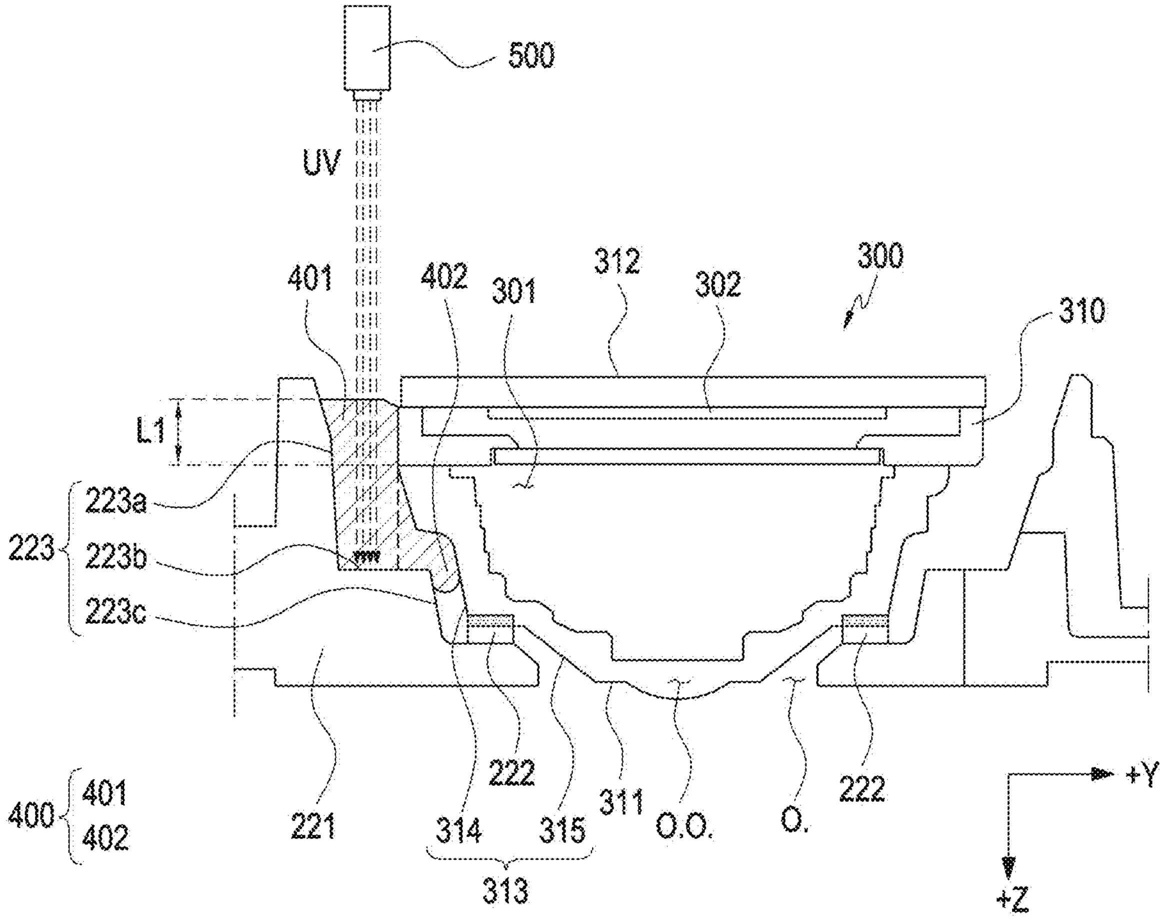
FIG. 6 is a view illustrating a state in which a UV-curable resin is filled and cured in a gap between a camera module according to an embodiment and a recess in a state in which the camera module is accommodated in the recess.

FIG. 6 is a view illustrating a state in which a UV-curable resin is filled and cured in a gap between a camera module according to an embodiment and a recess in a state in which the camera module is accommodated in the recess. According to an embodiment, the camera module 300 may be disposed in a state in which an optical opening (O.O.) of the camera module 300 is aligned to the recess 223 and the opening (O.) of the support member 221 in one direction (e.g., the +Z-axis direction).

Referring to FIG. 6, the camera module 300 may include a space 301 configured to be capable of accommodating at least one lens, a lens barrel 310 that encloses the at least one lens and/or the space 301, and an image sensor 302. The camera module 300 may include a first end portion 311 and a second end portion 312. During assembly, the camera module 300 may be disposed such that the first end portion 311 is oriented in a direction of gravity (e.g., the +Z-axis direction). The camera module 300 is accommodated in the recess 223 of the support member 221 and may be supported by a member 222 provided on the support member 221. Here, the member 222 may have elasticity and/or adhesiveness. In addition, the member 222 may serve to seal a space between the camera module 300 and the support member 221, thus preventing that a UV-curable resin 400 might flow out. The first end portion 311 of the camera module 300 is a portion having an optical opening (O.O.), and when the camera module 300 is accommodated in the recess 223, the first end portion 311 may be aligned with the opening (O.) of the support member 221. The first end portion 311 of the camera module 300 may be partially located on the same level as the opening (O.) or may protrude toward the front plate 210 or the display 220 through the recess 223 and the opening (O.). The second end portion 312 is a portion different from the first end portion 311 and, according to an embodiment, may be oriented in the opposite direction to the first end portion 311. For example, the second end portion 312 may correspond to the rear surface of the camera module 300 or the rear surface of a PCB. On the contrary, the first end portion 311 may correspond to a front surface of the camera module 300 facing the front surface plate 210.

Referring to FIG. 6, when the camera module 300 is disposed in the recess 223, a UV-curable resin 400 may fill a gap between the camera module 300 and the recess 223 to fix the camera module 300 to the support member 221. As an example, the process of filling the UV-curable resin 400 and the process of curing the UV-curable resin 400 may be performed after the optical opening (O.O.) of the camera module 300 is aligned to the recess 223 and/or the opening (O.) of the support member 221 in the direction of gravity (e.g., the +Z-axis direction) as illustrated in FIG. 6. When a predetermined amount or more of the UV-curable resin 400 is injected into the gap, the camera module 300 may be fixed to the support member 221 by curing the UV-curable resin 400 by using a UV emitting device 500.

In the embodiment illustrated in FIG. 6, the shape of the camera module 300 may be determined depending on the external shape of the lens barrel 310. Hence, the shape of the camera module 300 and the shape of the lens barrel 310 may substantially correspond to each other. According to an embodiment, the side surface of the camera module 300 may refer to the side surface 313 of the lens barrel 310. As described above, in the disclosure, the lens barrel 310 may have a shape that is generally convex toward the front surface plate 210 or the display 220 side. Referring to FIG. 6, in the state in which the lens barrel 310 is accommodated in the recess 223, the UV-curable resin 400 filled to the space between the side surface 313 of the lens barrel 310 and the recess 223 may flow downward (the direction of gravity (e.g., the +Z-axis direction)) along the side surface 313 and the recess 223 of the barrel 310 and may then flow in a horizontal direction (e.g., the +Y-axis direction) along an undercut portion of the side surface 313 of the lens barrel 310. Here, the "undercut portion" of the side surface 313 of the lens barrel 310 refers to a portion covered by the camera module 300 when the rear surface (e.g., 312) of the camera module 300 is viewed in the direction of gravity (e.g., the +Z-axis direction) in the state in which the camera module 300 is accommodated in the recess 223, as in the embodiment of FIG. 6. The "undercut portion" of the side surface 313 of the lens barrel 310 may be a portion of the lens barrel 310 in which the diameter of at least one portion becomes smaller than those of other portions in the direction of gravity (e.g., the +Z-axis direction). As the UV-curable resin 400 flows into the undercut portion of the side surface 313 of the lens barrel 310, a portion where UV light emitted from the UV emitting device 500 does not reach may occur. In FIG. 6, the direction of the light emitted by UV emitting device 500 is indicated vertical arrows, which are illustrated to not continue beyond a second surface **223*b*. For example, the UV-curable resin 400 may include a first resin portion 401 and a second resin portion 402, wherein when the camera module 300 is viewed in the state of being received in the recess 223 in the direction of gravity (e.g., the +Z-axis direction), the first resin portion 401 does not overlap the camera module 300 and the second resin portion 402 overlaps the camera module 300. The UV light emitted from the UV emitting device 500 may reach the first resin portion 401, but may not reach the second resin portion 402 or may have a small amount of light. Therefore, a portion of the resin that is not hardened or not sufficiently hardened may be present in the gap between the side surface 313 of the lens barrel 310 and the recess 223, and thus, the UV-curable resin 400 according to the embodiment illustrated in FIG. 6 may have low bonding strength based on a narrow bonding area (e.g., the area corresponding to the length L1**).

According to an embodiment, when the camera module 300 includes the lens barrel 310 having a convex shape, the camera module 300 may be easily applicable to a thin electronic device 100. For example, as illustrated in FIG. 6, since the outer diameter of the first end portion 311 of the lens barrel 310 is small, it is easy to dispose the lens barrel 310 close to the opening (O.) of the support member 221 or the camera hole H, and thus it is possible to provide a camera module 300 satisfying a pre-configured angle of view. However, as described above, the embodiment illustrated in FIG. 6 may additionally have a problem of low bonding strength between the recess 223 and the camera module 300.

Figure 7:
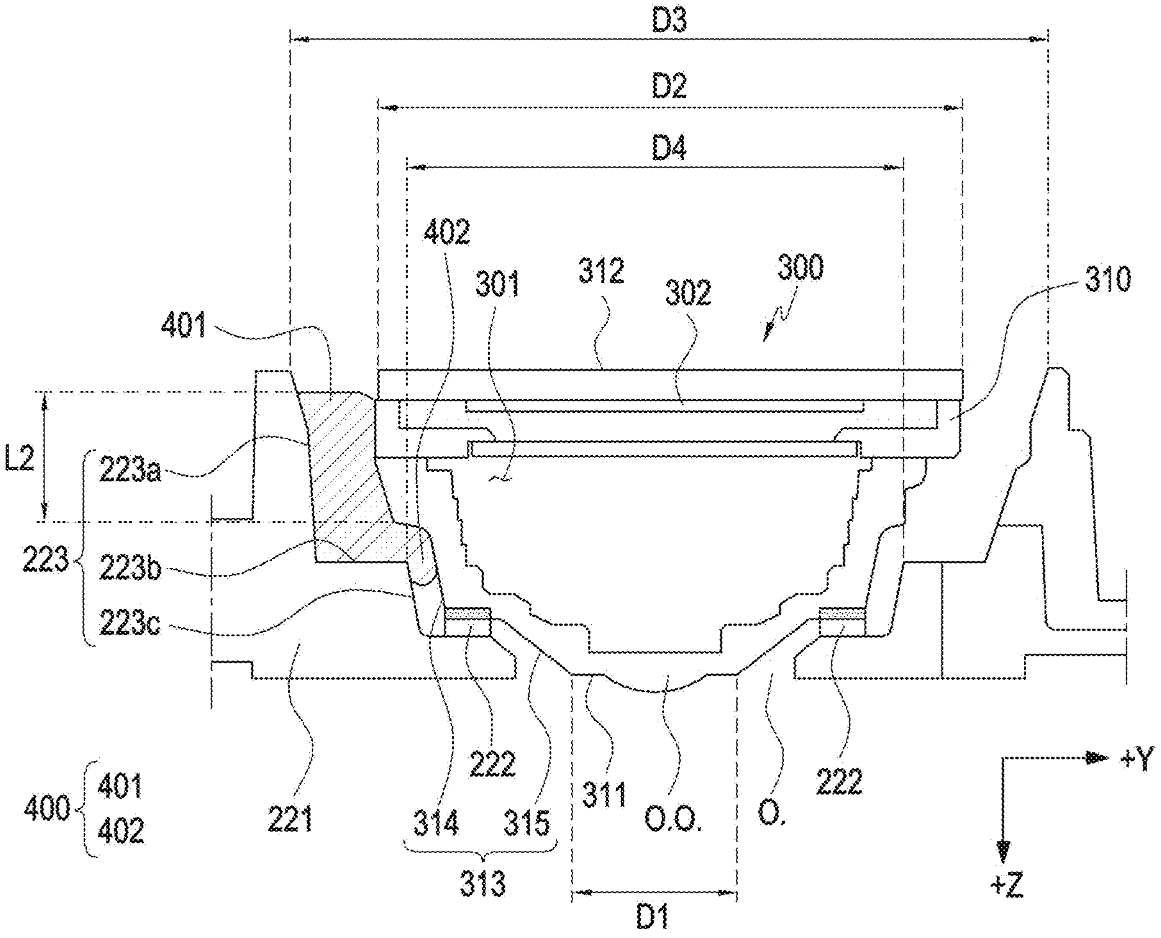
FIG. 7 is a view illustrating a state in which a UV-curable resin is filled in a gap between a camera module according to an embodiment and a recess in a state in which the camera module is accommodated in the recess.

FIG. 7 is a view illustrating a state in which a UV-curable resin is filled in a gap between a camera module according to an embodiment and a recess in a state in which the camera module is accommodated in the recess.

Referring to FIG. 7, the arrangement and/or structure of the camera module 300 and the recess 223 will be described in more detail. The camera module 300 may include at least one lens and a lens barrel 310 that encloses the at least one lens, wherein the lens barrel may include a first end portion 311 including an optical opening (O.O.) and a second end portion 312 adjacent to the image sensor 302. Since the camera module 300 according to an embodiment of the disclosure has a generally convex shape, the outer diameter D1 of the first end portion 311 may be smaller than the outer diameter D2 of the second end portion 312. In addition, the side surface 313 of the lens barrel 310 may include, between the second end portion 312 and the first end portion 311, a first side surface portion 314 that has an outer diameter smaller than the outer diameter D2 of the second end portion 312 and larger than the outer diameter D1 of the first end portion 311. Here, the first side surface portion 314 may be parallel or substantially parallel to the direction of gravity (e.g., the +Z-axis direction) or at least partially inclined at a predetermined angle with respect to the direction of gravity (e.g., +Z-axis direction). As illustrated in FIG. 6, the inclined angle of the first side surface portion 314 may be constant, but on the other hand, two or more inclined portions having different angles may be combined to form the first side surface portion 314. According to an embodiment, the first side surface portion 314 of the side surface 313 of the lens barrel 310 may face the second resin portion 402 where the UV-curable resin 400 overlaps the camera module 300.

The recess 223 may accommodate the camera module 300. The recess 223 may have a concave shape to provide a space for accommodating the camera module 300. For example, the shape of the recess 223 basically corresponds to a shape of the camera module 300. Accordingly, the recess 223 may include a first surface 223*a* providing a space having a first depth. In addition, the recess 223 may include a third surface 223*c* providing a space having a second depth. The recess 223 may provide a space for accommodating the camera module 300 by adding the first depth and the second depth. The recess 223 is configured to accommodate the camera module 300 and may serve to support the camera module 300 when the camera module 300 is mounted. According to an embodiment, the recess 223 may include a second surface 223*b* providing a step for supporting the camera module 300 between the first surface 223*a* and the third surface 223*c*. Here, the first surface 223*a* and/or the third surface 223*c* may be parallel to the direction of gravity (e.g., the +Z-axis direction) or may be at least partially inclined at a predetermined angle with respect to the direction of gravity (e.g., +Z-axis direction). Here, the inclined angle of the first surface 223*a* and/or the third surface 223*c* may be constant, but may include two or more inclined portions having different angles. According to an embodiment, here, at least a portion of the first surface 223*a* and a portion of the second surface 223*b* of the recess 223 may face the first resin portion 401 of the UV-curable resin 400 and the other portion of the second surface 223*b* and at least one portion of the third surface 223*c* of the recess 223 may face the second resin portion 402 of the UV-curable resin 400.

The first surface 223*a* of the recess 223 may have a maximum length D3 of an inner diameter providing a space for accommodating the camera module 330, wherein the maximum length D3 may be larger than the outer diameter D2 of the second end portion 312 of the camera module 300. However, in an embodiment, the outer diameter D2 of the second end portion 312 of the camera module 300 and the inner diameter D3 providing a space for accommodating the camera module 300 may also be substantially identical. The third surface 223*c* of the recess 223 may have a maximum length D4 of an inner diameter providing a space for accommodating the camera module 330, wherein the maximum length D4 may be smaller than the outer diameter D2 of the second end portion 312 of the camera module 300 and larger than the outer diameter D1 of the first end portion 311.

According to an embodiment, the side surface 313 of the lens barrel 310 may further include, between the first side surface portion 314 and the first end portion 311, a second side surface portion 315 having an outer diameter smaller than the outer diameter of the first side part 314 and larger than the outer diameter D1 of the first end portion 311. The second side surface portion 315 may be parallel to the direction of gravity (e.g., the +Z-axis direction). However, the disclosure is not necessarily limited thereto, and the second side surface portion 315 may at least partially include a portion inclined at a predetermined angle with respect to the direction of gravity (e.g., the +Z-axis direction). The second side surface portion 315 may be inclined at a constant angle, but may include two or more inclined portions having different angles. The second side surface portion 315 is a portion located between the first side surface portion 314 and the first end portion 311 and may be distinguished from the first side surface portion 314.

Referring to FIG. 7, according to an embodiment, the UV-curable resin 400 may not be disposed between the second side surface portion 315 and the recess 223. According to another embodiment, a member 222 may be disposed between the first side surface portion 314 and the second side surface portion 315. However, this is merely an example, and the scope of the disclosure is not limited thereto. For example, unlike the embodiment illustrated in FIG. 7, the UV-curable resin 400 may be filled up to a position facing the second side surface portion 315.

According to an embodiment, the angle of the UV emitting device 500 may be inclined so that some of the UV light is able to reach the second resin portion 402 overlapping the camera module 300. For example, the UV emitting device 500 illustrated in FIG. 6 is disposed to emit UV in the direction of gravity (e.g., the +Z-axis direction), but according to an embodiment, the angle of the UV emitting device 500 may be inclined at a predetermined angle with respect to the direction of gravity (e.g., the +Z-axis direction). In this case, the UV light emitted from the UV emitting device 500 may reach at least a portion of the second resin portion 402 overlapping the camera module 300. Accordingly, the UV-curable resin 400 may have bonding strength based on a slightly wider bonding area (e.g., the area corresponding to the length of L2) compared to the embodiment illustrated in FIG. 6. As such, there is a method of improving the bonding strength of the UV-curable resin 400 in the state in which the angle of the UV emitting device 500 is inclined, but even with this method, there may be an undercut portion where UV light does not reach due to the shape characteristic of the camera module 300 (e.g., the convex shape). That is, even if UV light is emitted in the state in which the UV emitting device is inclined, it may be difficult for the UV-curable resin 400 provided around the camera module 300 to have sufficient bonding strength.

Figure 8:
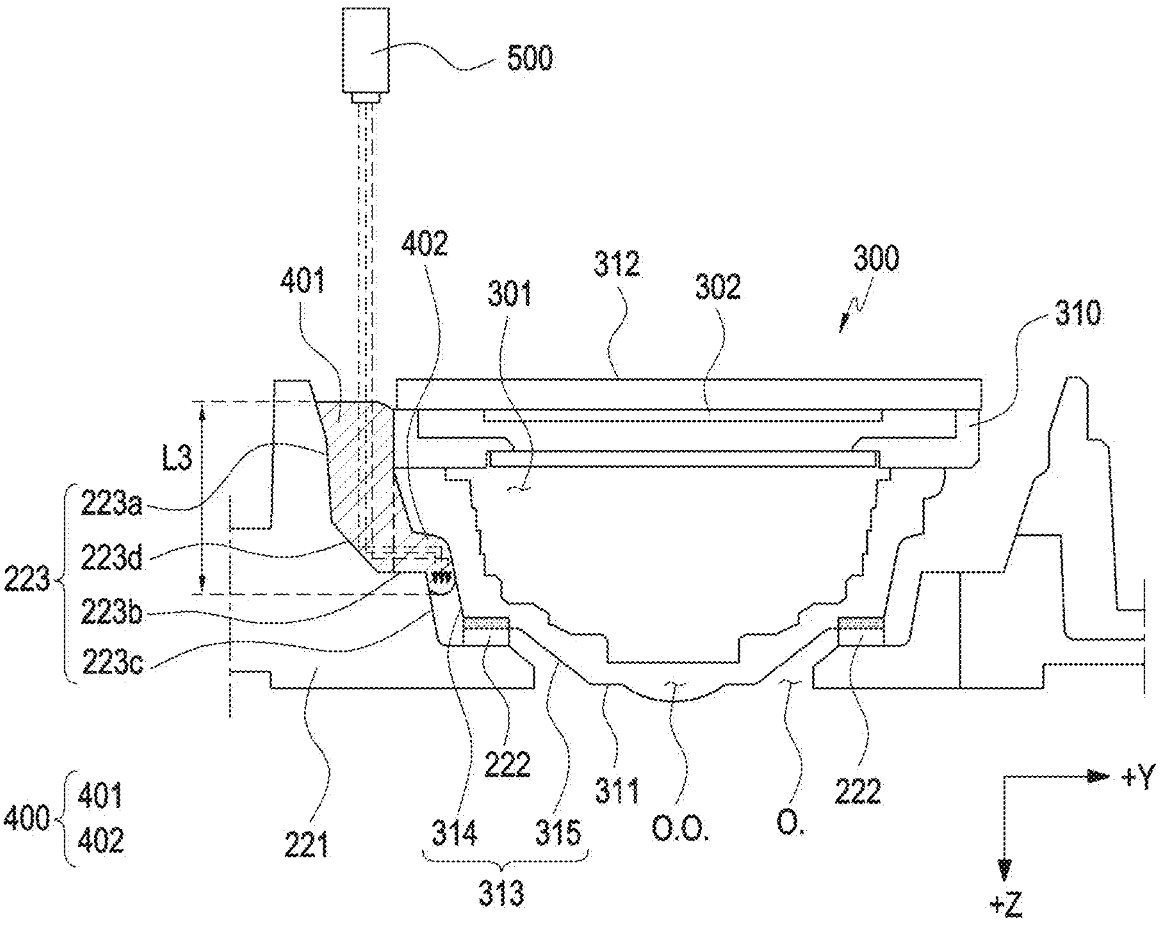
FIG. 8 is a view illustrating a state in which a UV-curable resin is filled and cured in a gap between a camera module according to an embodiment and a recess in a state in which the camera module is accommodated in the recess.

FIG. 8 is a view illustrating a state in which a UV-curable resin is filled and cured in a gap between a camera module according to an embodiment and a recess in a state in which the camera module is accommodated in the recess.

Referring to FIG. 8, according to an embodiment of the disclosure, the recess 223 may include an inclined surface 223*d* provided between the first surface 223*a* and the second surface 223*b*. By including the inclined surface 223*d* in the recess 223, the UV light emitted from the UV emitting device 500 may be properly refracted and reflected so that the path through which passes can be extended. This may make it possible to increase the curing degree of the UV-curable resin 400 and to increase bonding strength. That is, the electronic device 100 of the disclosure may have an effect of increasing reflectivity for UV light by including the inclined surface 223*d* in the recess 223 around the camera module 300. According to, for example, the embodiment illustrated in FIG. 8, the inclined surface 223*d* provided between the first surface 223*a* and the second surface 223*b* is illustrated as having an angle θ1 (not shown in FIG. 8) of about 45 degrees with respect to the second surface 223*b*, but is not necessarily limited thereto. UV light incident from the UV emitting device 500 in a direction parallel to the direction of gravity (e.g., +Z-axis direction) may be refracted and reflected by the inclined surface 223*d* while passing through the first resin portion 401 of the UV-curable resin 400 and may then reach the second resin portion 402 of the UV-curable resin 400 located in the undercut portion of the camera module 300. By including the inclined surface 223*d* in the recess 223, the UV light may be guided to a portion overlapping the camera module 300 (the second resin portion 402). As a result, it is possible to increase the degree of curing of the UV-curable resin 400, and it is possible for the bonding area of the UV-curable resin (e.g., corresponding to the length of L3) to have higher bonding strength by being increased compared to that in the embodiment of FIG. 6. Depending on the shape of the recess 223 and the shape of the first end portion 311 of the lens barrel 310, at least one further inclined surface might be provided. Hence, the present disclosure is not limited to the inclined surface 223*d*.

Figure 9:
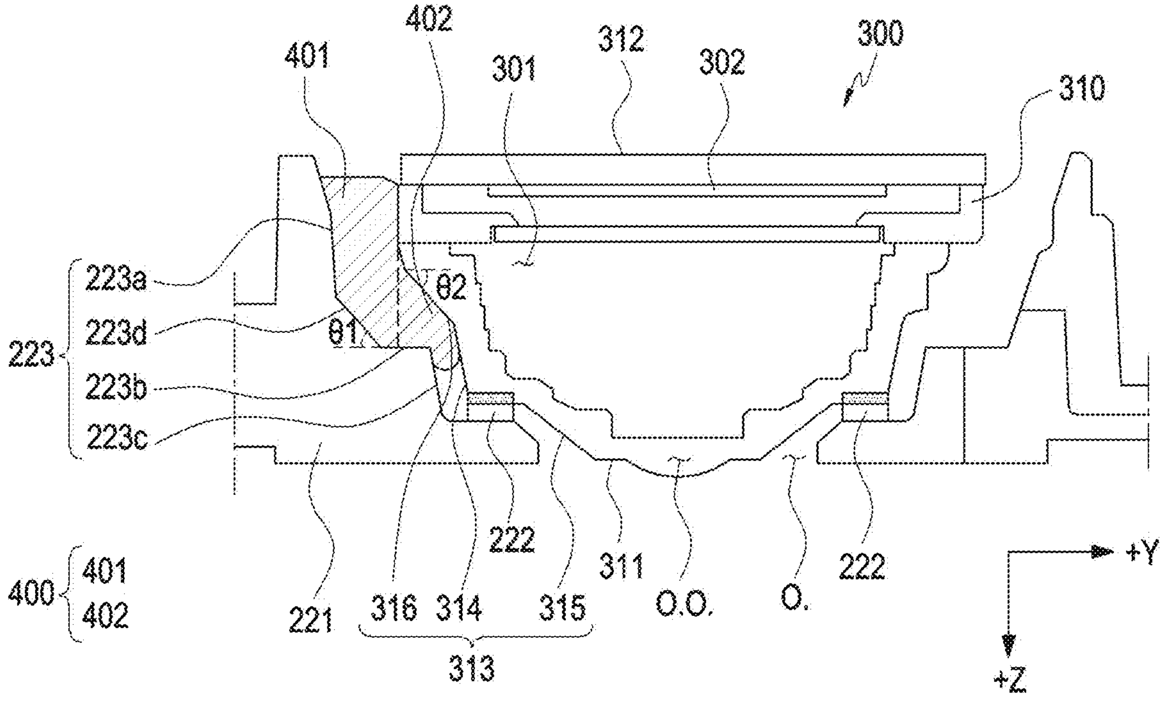
FIG. 9 is a view illustrating a state in which a UV-curable resin is filled in a gap between a camera module according to an embodiment and a recess in a state in which the camera module is accommodated in the recess.

FIG. 9 is a view illustrating a state in which a UV-curable resin is filled in a gap between a camera module according to an embodiment and a recess in a state in which the camera module is accommodated in the recess.

Referring to FIG. 9, an inclined surface 316 may also be provided on the side surface 313 of the lens barrel 310 of the camera module 300. The inclined surface 316 formed on the side surface 313 of the lens barrel 310 may be provided at a position corresponding to the inclined surface 223*d* of the recess 223. According to an embodiment, the inclined surface 316 may be provided at the substantially same depth (or level) as the position where the inclined surface 223*d* of the recess 223 is provided. For example, the location of the inclined surface 316 provided on the side surface 313 of the lens barrel 310 may be a point where a virtual line meets the first side surface portion 314 when the virtual line is drawn in a horizontal direction (e.g., the +Y-axis direction) perpendicular to the direction of gravity (e.g., the +Z-axis direction) from the inclined surface 223*d* of the recess 223. That is, according to an embodiment, an inclined surface 316 corresponding to the inclined surface of the recess may be provided on the first side surface portion 314 of the lens barrel 310.

According to an embodiment, the inclined surface 316 provided on the side surface 313 of the lens barrel 310 may not be parallel to the inclined surface 223*d* of the recess 223. For example, when the inclined surface 223*d* of the recess 223 may be inclined at an angle θ1 of about 45 degrees with respect to the direction of gravity (e.g., the +Z-axis direction), the inclined surface 316 provided on the side surface 313 of the lens barrel 310 may be inclined at an angle θ2 of approximately 35 degrees with respect to the direction of gravity (e.g., the +Z-axis direction). Alternatively, when the inclined surface 223*d* of the recess 223 is inclined at an angle θ1 of about 35 degrees with respect to the direction of gravity, it is also possible to apply an embodiment in which the inclined surface 316 provided on the side surface 313 of the lens barrel 310 is inclined at an angle θ2 of about 45 degrees. In this way, regarding the angle between the inclined surface 316 provided on the side surface 313 of the lens barrel 310 and the inclined surface 223*d* of the recess 223, the scope of the disclosure is not limited to any specific shape. According to an embodiment, the inclined surface 316 provided on the side surface 313 of the lens barrel 310 may be parallel (e.g., substantially parallel), to the inclined surface 223*d* of the recess 223. According to some embodiments, the UV-curable resin may have the highest degree of curing when the inclined angles θ1 of the inclined surface 223*d* of the recess 223 with respect to the direction of gravity (e.g., the +Z-axis direction) and the inclined angle θ2 of the inclined surface 316 provided on the side surface 313 of the lens barrel 310 with respect to the direction of gravity (e.g., the +Z-axis direction) are equal to each other. For example, in the case where the inclined surface 223*d* of the recess 223 is inclined at an angle of about 45 degrees with respect to the direction of gravity, when the inclined surface 316 provided on the side surface 313 of the lens barrel 310 may also be inclined at an angle of approximately 45 degrees, the curing degree of the UV-curable resin may be the highest, and accordingly, the bonding strength of the UV-curable resin may be the highest. However, dependent on the shape of the lens barrel 310, other values for the inclined angles θ1 and θ2 may be used in e.g. a range of 30 to 60 degrees, such as 30, 35, 40, 45, 50, 55 or 60 degrees. The present disclosure is not limited to a specific angle.

The electronic device 100 according to an embodiment of the disclosure may not only include the inclined surface 223*d* of the recess 223 having a shape that facilitates the reflection of UV light, but may also include a material that facilitates the reflection of UV light.

Various embodiments may be used to make the inclined surface 223*d* of the recess 223 include a material that facilitates reflection. According to an embodiment, the inclined surface 223*d* of the recess 223 may contain an aluminum material. For example, when the support member 221 is made of aluminum, a coating is typically applied to the surface of the support member 221 to protect the support member 221. However, by peeling off the coating of a portion of the inclined surface 223*d* of the recess 223 to reveal the aluminum material to the exterior, it is possible to facilitate the reflection of UV light. In addition, for example, when the support member 221 is made of magnesium, it may be difficult to reflect UV light due to the nature of the material of magnesium, it is possible to facilitate reflection by additionally applying a reflective material such as an aluminum material to a portion of the inclined surface 223*d* of the recess 223. However, the present disclosure is not limited to any of the aforementioned materials.

Meanwhile, the electronic device 100 according to an embodiment of the disclosure may not only include the inclined surface 223*d* of the recess 223 in a shape that facilitates the reflection of UV light, but may also additionally or alternatively include a material that facilitates reflection in the inclined surface 316 provided on the side surface 313 of the lens barrel 310. For example, a reflective material such as aluminum may be applied to the side surface 313 of the lens barrel 310.

According to an embodiment, the reflection of UV light may be facilitated by additionally or alternatively performing a polishing operation, in addition to exposing the reflective material or additionally applying a reflective material to the inclined surface 223*d* of the recess 223 provided in the support member 221 and/or the inclined surface 316 provided on the side surface 313 of the lens barrel 310.

According to an embodiment, the inclined surface 223*d* of the recess 223 may have higher reflectivity than the first surface 223*a* and the second surface 223*b*. According to an embodiment, the inclined surface 316 provided on the side surface 313 of the lens barrel 310 may have higher reflectivity than the first side surface portion 314 and the second side surface portion 315.

According to the embodiment of FIGS. 6 to 9, it is illustrated that a UV-curable resin 400 is filled in only one portion of the side surface 313 of the lens barrel 310. In contrast, it is to be noted that the UV-curable resin 400 may be filled in not only the one portion but also the other portions of the side surface 313 of the lens barrel 310, e.g., the corresponding portions on the right side of the lens barrel 310 in FIGS. 6 to 9.

Figure 10:
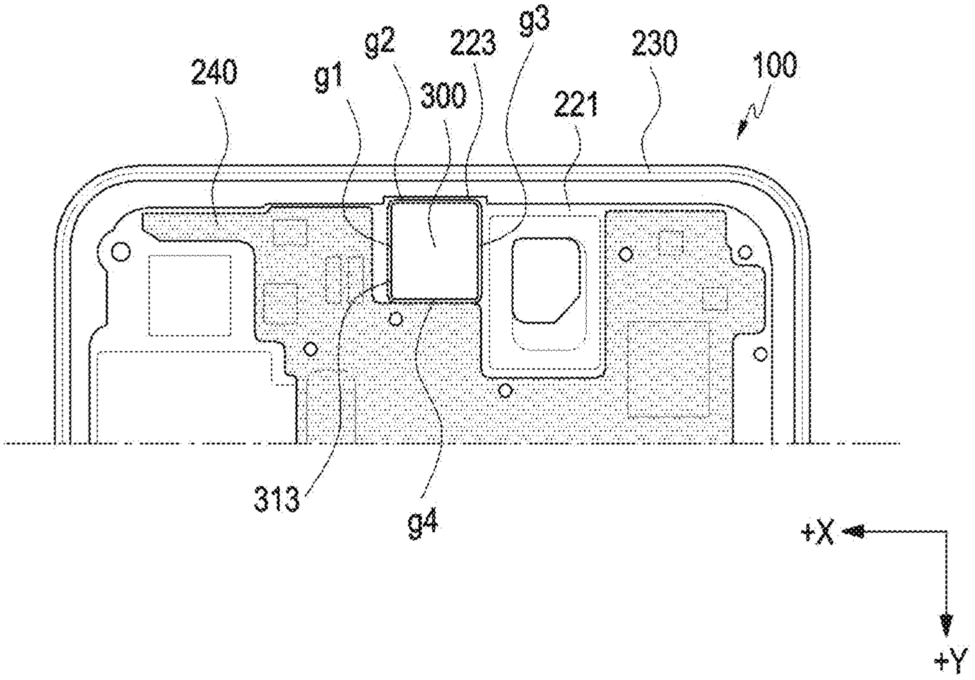
FIG. 10 is a view illustrating a state in which a camera module is disposed in an electronic device according to an embodiment.
Figure 11:
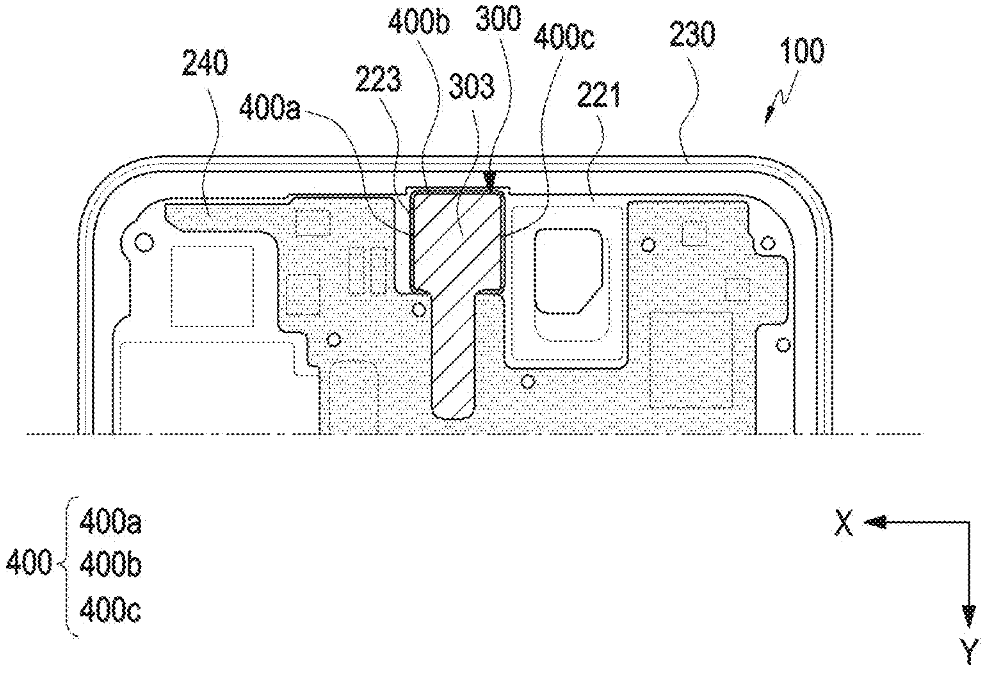
FIG. 11 is a diagram illustrating a state in which an FPCB is connected to a camera module disposed in an electronic device according to an embodiment.

FIG. 10 is a view illustrating a state in which a camera module is disposed in an electronic device according to an embodiment. FIG. 11 is a diagram illustrating a state in which an FPCB is connected to a camera module disposed in an electronic device according to an embodiment.

When the camera module 300 is accommodated and aligned in the recess 223 of the support member 221, a gap may be provided between the camera module 300 and the recess 223 in consideration of tolerances between these parts. The gap may include a plurality of gaps g1, g2, g3, and g4. For example, when the cross-sectional structure of the camera module 300 has a quadrangular shape, the plurality of gaps g1, g2, g3, and g4 may substantially surround the side surface 313 of the lens barrel of the camera module 300, as illustrated in FIG. 10. The position of the camera module 300 may be fixed by filling and curing UV-curable resin in at least one of the plurality of gaps g1, g2, g3, and g4.

Referring to FIG. 11, in the electronic device 100 according to an embodiment of the disclosure, the inclined surface 223*d* of the recess 223 for facilitating the reflection of UV light may be provided in consideration of the arrangement of the camera module 300 and peripheral components. For example, a FPCB 303 may be connected to the camera module 300 to be electrically connected to another component (e.g., a processor) inside the electronic device. Referring to FIG. 11, the FPCB 303 may extend long toward one side (e.g., the lower end portion) of the electronic device 100. The UV-curable resin 400 may be filled in consideration of the arrangement of the camera module 300. For example, when the cross-sectional structure of the camera module 300 has a rectangular shape, the UV-curable resin 400 may include, for example, UV-curable resins 400*a*, 400*b*, and 400*c* provided at positions corresponding to remaining three surfaces except for the direction where the FPCB 303 extends. Furthermore, to correspond to the positions where the UV-curable resins 400*a*, 400*b*, and 400*c* are provided, the inclined surface 223*d* of the recess 223 configured to facilitate the reflection of UV light provided in the electronic device 100 may also be provided at positions corresponding to remaining three surfaces except for the direction where the FPCB 303 connected to the camera module 300 extends. In this case, to correspond to the UV-curable resin 400, the inclined surface 223*d* of the recess 223 may be provided in a continuously extending form (e.g., "⊏" shape) to correspond to the remaining three surfaces except for the direction where the FPCB 303 connected to the camera module 300 extends. However, embodiments of the disclosure are not necessarily limited to those described above. It is to be noted that to correspond to the UV-curable resin 400, the inclined surface 223*d* of the recess 223 may be provided in a partially discrete form while being disposed at positions corresponding to other three remaining surfaces except for the direction where the FPCB 303 connected to the camera module 300 extends.

The electronic device 100 of the disclosure may include a recess 223 having an inclined surface 223*d* provided around the camera module 300, and elements according to various embodiments described above may be applied in relation to this. Accordingly, in the electronic device 100 of the disclosure, when an adhesive (e.g., a UV-curable resin) is cured by UV at the time of vision alignment of the camera module 300, it is possible to increase the depth at which the UV-curable resin is cured. As a result, according to various embodiments of the disclosure, it is possible to provide an electronic device 100 having very high bonding strength between the camera module 300 and peripheral parts of the same.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 100). For example, a processor (e.g., the processor) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, it is possible to provide an electronic device 100 including a camera module 300 having an angle of view toward in a first direction (the +Z-axis direction), a recess 223 configured to accommodate the camera module, and a UV-curable resin 400 formed in a gap between the camera module and the recess. The camera module 300 may include a lens barrel 310 that encloses the at least one lens and has convex shape toward the first direction. When the camera module is viewed in the first direction in a state in which the camera module is accommodated in the recess, UV-curable resin 400 may include a first resin portion 401 which does not overlap with the camera module and a second resin portion 402 which overlaps with the camera module. The recess 223 may include a first surface **223*a* and a second surface 223*b*, which are in contact with the first resin portion, and an inclined surface 223*d* provided between the first surface 223*a* and the second surface 223*b***.

According to an embodiment, the lens barrel 310 may include a first end portion 311 where an optical opening is formed and a second end portion 312 located adjacent to an image sensor, the first end portion having an outer diameter smaller than that of the second end portion, and the lens barrel 310 may further include, between the second end portion and the first end portion, a first side surface portion 314 having an outer diameter smaller than that of the second end portion and larger than that of the first end portion.

According to an embodiment, a side surface 313 of the lens barrel 310 may further include, between the first side surface portion and the first end portion, a second side surface portion 315 having an outer diameter smaller than that of the first side surface portion and larger than that of the first end portion.

According to an embodiment, an outer diameter of the inclined surface becomes smaller toward the first end portion 311 of the lens barrel 310.

According to an embodiment, the recess may be formed in a support member 221 or a side surface bezel 230 of a housing.

According to an embodiment, the electronic device may include a front surface plate 210 and a display 220 disposed on the rear surface of the front surface plate.

According to an embodiment, the camera module may be an under display camera (UDC).

According to an embodiment, a side surface 313 of the lens barrel 310 may include an inclined surface 316 corresponding to the inclined surface of the recess.

According to an embodiment, the inclined surface 316 of the lens barrel 310 may be parallel to the inclined surface **223*d* of the recess 223**.

According to an embodiment, the inclined surface **223*d* of the recess 223 may have higher reflectivity than the first surface 223*a* and the second surface 223*b***.

According to an embodiment, the inclined surface **223*d* of the recess 223** may include a reflective material containing aluminum and/or magnesium.

According to an embodiment, the inclined surface **223*d* of the recess 223** may be formed through a polishing process.

According to an embodiment, the side surface 313 of the lens barrel 310 may include an inclined surface 316 having higher reflectivity than the first side surface portion 314 and the second side surface portion 315.

According to an embodiment, the inclined surface 316 of the side surface 313 of the lens barrel 310 may include a reflective material containing aluminum and/or magnesium.

According to an embodiment, the inclined surface 316 of the side surface 313 of the lens barrel 310 may be provided through a polishing process.

According to an embodiment, the camera module may be connected to an FPCB, and the UV-curable resin may be filled to correspond to a remaining surface except for a surface in a direction in which the FPCB connected to the camera module extends.

According to an embodiment, the inclined surface **223*d* of the recess 223** may be formed to correspond to the remaining surface except for the surface in the direction in which the FPCB connected to the camera module extends.

According to an embodiment of the disclosure, it is possible to provide an electronic device 100 including a camera module 300 having an angle of view toward in a first direction; and a recess 223 configured to accommodate the camera module. The camera module 300 may include at least one lens, and a lens barrel 310 configured to enclose the at least one lens, wherein the lens barrel 310 includes a first end portion 311 where an optical opening is formed and a second end portion 312 located adjacent to the image sensor, the first end portion having an outer diameter smaller than that of the second end portion, and the lens barrel 310 may further include, between the second end portion and the first end portion, a first side surface portion 314 having an outer diameter smaller than that of the second end portion and larger than that of the first end portion, and the recess may include an inclined surface 223*d* whose outer diameter becomes smaller toward the first end portion of the lens barrel.

According to an embodiment, the electronic device may include a UV-curable resin 400 disposed in a gap between the camera module and the recess. When the camera module is viewed in the first direction in a state in which the camera module is accommodated in the recess, the UV-curable resin 400 may include a first resin portion 401 which does not overlap with the camera module and a second resin portion 402 which overlaps with the camera module. The recess 223 of the housing may include a first surface 223*a* and a second surface 223*b* which are in contact with the first resin portion, and an inclined surface 223*d* having higher reflectivity than the first surface 223*a* and the second surface 223*b* may be formed between the first surface 223*a* and the second surface 223*b*.

According to an embodiment, the lens barrel 310 may include a first end portion 311 where an optical opening is formed and a second end portion 312 located adjacent to an image sensor, the first end portion having an outer diameter smaller than that of the second end portion, and the lens barrel 310 may further include, between the second end portion and the first end portion, a first side surface portion 314 having an outer diameter smaller than that of the second end portion and larger than that of the first end portion.

According to an embodiment, the lens barrel may further include, between the first side surface portion and the first end portion, a second side surface portion 315 having an outer diameter smaller than that of the first side surface portion and larger than that of the first end portion.

According to an embodiment, an inclined surface 316 corresponding to the inclined surface of the recess may be provided on the side surface of the lens barrel.

According to an embodiment, the electronic device may include a front surface plate 210 and a display 220 disposed on a rear surface of the front surface plate, and the camera module may be an under display camera (UDC).

According to an embodiment, the inclined surface of the lens barrel may be parallel to the inclined surface of the recess.

According to an embodiment, the camera module may include an FPCB extending from one surface to one side, the UV-curable resin may be filled to correspond to a remaining surface except for a surface in which the FPCB extends in the camera module, and the inclined surface 223*d* of the recess 223 may be provided to correspond to the remaining surface of the camera module except for the surface in which the FPCB extends in the camera module to correspond to the UV-curable resin.

According to an embodiment of the disclosure, it is possible to provide an electronic device 100 including a camera module 300 having an angle of view formed in a first direction, and a recess 223 configured to accommodate the camera module. The camera module 300 may include at least one lens, and a lens barrel 310 that encloses the at least one lens and includes at least one portion having an outer diameter that becomes smaller toward the first direction, wherein the recess 223 includes an inclined surface 223*d* inclined toward the lens barrel 310.

According to an embodiment, the lens barrel 310 may include, on the side surface 313 thereof, an inclined surface 316 corresponding to the inclined surface of the recess.

In the foregoing detailed description of the disclosure, specific embodiments have been described. However, it will be evident to a person ordinarily skilled in the art that various modifications can be made without departing from the scope of the disclosure.

What is claimed is:

1. An electronic device comprising:

a camera module having an angle of view toward a first direction;

a recess configured to accommodate the camera module; and a UV-curable resin formed in a gap between the camera module and the recess, wherein the camera module comprises a lens barrel that encloses at least one lens and has a convex shape toward the first direction, wherein, in case that the camera module is viewed in the first direction in a state in which the camera module is accommodated in the recess, the UV-curable resin comprises a first resin portion which does not overlap with the camera module and a second resin portion which overlaps with the camera module, and wherein the recess comprises a first surface and a second surface, which are in contact with the first resin portion, and an inclined surface between the first surface and the second surface.

2. The electronic device of claim 1, wherein the lens barrel comprises a first end portion with an optical opening and a second end portion located adjacent to an image sensor, the first end portion having an outer diameter smaller than that of the second end portion, and wherein the lens barrel further comprises, between the second end portion and the first end portion, a first side surface portion having an outer diameter smaller than that of the second end portion and larger than that of the first end portion.

3. The electronic device of claim 2, wherein a side surface of the lens barrel further comprises, between the first side surface portion and the first end portion, a second side surface portion having an outer diameter smaller than that of the first side surface portion and larger than that of the first end portion.

4. The electronic device of claim 3, wherein the side surface of the lens barrel comprises an inclined surface having higher reflectivity than the first side surface portion and the second side surface portion.

5. The electronic device of claim 2, wherein an outer diameter of the inclined surface is configured to decrease toward the first end portion of the lens barrel.

6. The electronic device of claim 1, wherein the recess is located in a support member or a side surface bezel structure of a housing.

7. The electronic device of claim 1, further comprising:

a front surface plate; and a display disposed on a rear surface of the front surface plate.

8. The electronic device of claim 1, wherein the camera module is an under display camera, UDC.

9. The electronic device of claim 1, wherein a side surface of the lens barrel comprises an inclined surface corresponding to the inclined surface of the recess.

10. The electronic device of claim 9, wherein the inclined surface of the lens barrel is parallel to the inclined surface of the recess.

11. The electronic device of claim 1, wherein the inclined surface of the recess has higher reflectivity than the first surface and the second surface.

12. The electronic device of claim 1, wherein the inclined surface of the recess comprises a reflective material containing aluminum and/or magnesium, and/or wherein the inclined surface of the recess is formed through a polishing process.

13. The electronic device of claim 1, wherein the camera module is connected to an FPCB, and wherein the UV-curable resin is filled to correspond to a remaining surface except for a surface in a direction in which the FPCB connected to the camera module extends.

14. The electronic device of claim 13, wherein the inclined surface of the recess corresponds to the remaining surface except for the surface in the direction in which the FPCB connected to the camera module extends.

15. The electronic device of claim 1, wherein the lens barrel has an outer diameter that becomes smaller toward the first direction.

* * * * *